United States Patent [19]

Fedor et al.

[11] 3,969,480

[45] July 13, 1976

[54] NICKEL BASE $NO_x$ REDUCING CATALYTIC STRUCTURE

[75] Inventors: Robert J. Fedor, Westlake; Cameron S. Ogden, Hudson, both of Ohio

[73] Assignee: Gould Inc., Rolling Meadows, Ill.

[22] Filed: Mar. 14, 1974

[21] Appl. No.: 451,032

Related U.S. Application Data

[63] Continuation-in-part of Ser. No. 207,284, Dec. 13, 1971, abandoned, which is a continuation-in-part of Ser. No. 149,331, June 2, 1971, abandoned.

[52] U.S. Cl. .......................... 423/213.5; 23/288 F; 60/299; 60/301; 252/477 R
[51] Int. Cl.$^2$ ........................................ C01B 33/00
[58] Field of Search ................ 423/213.2, 213.5; 252/477; 23/288 F; 60/299, 301

[56] References Cited
UNITED STATES PATENTS

| | | | |
|---|---|---|---|
| 1,934,975 | 11/1933 | Frazer | 423/213.5 |
| 2,526,657 | 10/1950 | Guyer | 23/288 F |
| 3,257,163 | 6/1966 | Stiles | 423/213.2 |

OTHER PUBLICATIONS

Bernstein et al., "Application of Catalysts to Automotive $No_x$ Emission Control," SAE 710014, Jan. 1971, Chemical Abstracts, vol. 69, 1963, p. 13,258.

*Primary Examiner*—G. O. Peters
*Attorney, Agent, or Firm*—Edward E. Sachs

[57] ABSTRACT

A system for reducing $NO_x$ gases found in the exhaust stream of the internal combustion engine is provided which includes an internal combustion engine having associated therewith a means for supplying fuel and oxygen to the engine, a manifold system for directing or channeling the exhaust gases from the engine, and a $NO_x$ reducing catalyst assembly communicating with the manifold which includes a housing having a $NO_x$ reducing catalytic structure of apertured thin metal foil positioned therein which comprises a durable, chromium containing corrosion resistant nickel base substrate having on at least one surface, an effective amount of a $NO_x$ reducing catalyst selected from the group consisting of iron, nickel, cobalt, copper, manganese and mixtures thereof.

19 Claims, 4 Drawing Figures

NICKEL BASE NO$_x$ REDUCING CATALYTIC STRUCTURE

BACKGROUND OF THE INVENTION

This application is a continuation-in-part of U.S. patent application Ser. No. 207,284, filed 12/13/71, which, in turn, is a continuation-in-part of U.S. patent application Ser. No. 149,331 filed 6/02/71, both now abandoned.

This invention relates to a system of operating an internal combustion engine and includes the use of a catalytic structure capable of reducing oxides of nitrogen, especially nitric oxide and nitrogen dioxide (herein collectively referred to as NO$_x$), which are found in the exhaust gases emanating from an internal combustion engine. In addition, it concerns a catalytic structure comprising a durable, corrosion resistant nickel base substrate having an effective amount of a NO$_x$ reducing catalyst metallurgically bonded thereto. Such a catalytic structure is characterized by its corrosion resistance and is especially effective in reducing the oxides of nitrogen at temperatures of about 1100°F and above.

DESCRIPTION OF THE PRIOR ART

Many undesirable gases are found in the exhaust stream emanating from the internal combustion engine. Some of the most harmful and annoying of these gases are carbon monoxide, unburned hydrocarbons and the oxides of nitrogen.

Presently, much effort is being directed to the removal of carbon monoxide and unburned hydrocarbons by thermal or catalytic oxidation, and to the diminution or elimination of the oxides of nitrogen by catalytic reduction.

With regard to the various oxides of nitrogen, herein referred to as NO$_x$, it is the present desire to eliminate least 90 percent of the NO$_x$ issuing from the typical internal combustion engine, using the 1971 U.S.A. model automotive vehicle as the base.

In the prior art, references can be found which concern certain catalysts that are, at least theoretically, capable of reducing NO$_x$ to less harmful substances. However, such prior art is devoid of any reference or teaching which concerns a durable, economical catalyst system which is especially well suited for use in the operating environment associated with today's automobiles.

In the main, this is due to the fact that the present stringent NO$_x$ reduction requirements necessitate the operation of the catalyst in a corrosive atmosphere at unusually high temperatures. For example, under normal operating conditions in a conventional internal combustion engine, such a catalyst is often exposed to temperatures ranging from about 1100° to 1700°F, and higher. Under these operating conditions, it has heretofore been essentially impossible to find a NO$_x$ reducing catalyst which evidences the requisite catalytic efficiency and also possesses the necessary structural durability.

As typical of the prior art, tests have been published indicating that nickel-copper alloys are very active catalytic NO$_x$ reduction devices. In use, these catalytic devices are formed into Berl saddles to increase the surface area and to provide for a relatively low pressure catalyst containing assembly. However, in actual operation, experience has indicated that nickel-copper alloys have an oxidation limit of about 1300°F, or slightly higher, whereas present day internal combustion engines have an efflux temperature, during some part of the normal operating cycle, of up to about 1900°F. Such high temperatures cause a rapid deterioration of the catalyst and substantially reduce its effective life span. Furthermore, the preferred structure of prior art devices, such as the saddles mentioned above, are caused at high temperatures to be sintered together to a point where eventually significant gas blockage occurs. Thus, while copper-nickel alloys are sufficiently active in reducing up to 90% of the NO$_x$ present, they are impractical at this time due to a lack of durability.

An extensive analysis of various catalytic structures and the problems pertaining thereto was published by the Society of Automotive Engineers on July 11, 1971, in SAE paper No. 710291, entitled "NO$_x$ Reduction Catalysts for Vehicle Emission Control". This article includes the disclosure of a composite of copper and stainless steel in the form of wire mesh screen. Still other approaches are indicated in U.S. Pat. No. 3,565,574 and British Patent No. 1,058,706. The latter discloses a ceramic substrate and is thus representative of a catalyst in which the activating, or NO$_x$ reducing material, does not withstand high temperatures by itself but must be supported by a suitable substrate.

In general, it may be summarized that presently known catalyst structures have failed to provide the required degree of NO$_x$ reduction due to a lack of structural rigidity at high temperatures, insufficient corrosion resistance, back-pressure build up due to agglomeration, spalling of the catalytically active surface, or a combination of any or all of these shortcomings.

The instant invention overcomes the hereinbefore set forth types of problems associated with prior art devices by providing a system for operating an internal combustion engine which includes the use of a durable, efficient NO$_x$ reducing catalytic structure comprising a corrosion resistant substrate having an effective amount of a suitable NO$_x$ reduction catalyst metallurgically bonded thereto.

SUMMARY OF THE INVENTION

According to one aspect of the invention, a system for reducing NO$_x$ gases found in the exhaust stream of the internal combustion engine is provided which includes an internal combustion engine having associated therewith a means for supplying fuel and oxygen to the engine, a manifold system for directing or channeling the exhaust gases from the engine, and a NO$_x$ reducing catalyst assembly communicating with the manifold which includes a housing having a NO$_x$ reducing catalytic structure of apertured thin metal foil positioned therein which comprises a durable, chromium containing corrosion resistant nickel base substrate having on at least one surface, an effective amount of a NO$_x$ reducing catalyst selected from the group consisting of iron, nickel, cobalt, copper, manganese and mixtures thereof.

According to another aspect, the present invention is accomplished by providing a NO$_x$ reducing catalytic structure comprising a durable, corrosion resistant nickel base support or substrate having an effective amount of a NO$_x$ reducing catalyst metallurgically bonded thereto.

As used herein the term "nickel base substrate" shall mean a substrate wherein the weight percent of nickel always exceeds the individual weight percent of any other filler material, viz., cobalt and/or iron.

In addition, as used herein the term "metallurgically bonded" shall mean bonded together by the formation of a localized alloy.

More specifically, the catalytic structure of the instant invention comprises a chromium containing nickel base substrate, which also contains comparatively minor but more than trace amounts of iron and/or cobalt, having a $NO_x$ reducing catalyst metallurgically bonded to at least one surface of the substrate. The term "more than trace amounts" as used herein shall mean individual amounts of material in excess of 1 weight percent of the substrate. In this system, chromium is an oxide former and imparts corrosion resistance to the substrate, whereas nickel, cobalt and iron are filler materials which impart strength and mass to the substrate. The amount of filler material in the substrate can range from about 50 to about 85 weight percent, with the remainder usually being chromium. In the nickel base system of the present invention, up to 40 weight percent of cobalt or iron can be added to the substrate composition, provided that the individual weight percent of both cobalt and iron is less than the weight percent of nickel. In such a nickel base system, the minimum nickel content is about 17 weight percent of the substrate. In addition, aluminum can be included in the substrate composition of the invention. However, when aluminum is substituted for some of the chromium, the total weight percent of aluminum plus chromium cannot exceed about 50 weight percent.

Perhaps, it should be noted here that under certain conditions, it may be desirable to form the substrate from iron or cobalt base alloys. See commonly assigned copending U.S. patent applications Ser. Nos. 207,525; 207,337; 207,303; and 207,281 entitled, Cobalt Base $NO_x$ Reducing Catalytic Structure, Self-Supporting $NO_x$ Reducing Catalyst, Chromium Containing Iron Base $NO_x$ Reducing Catalytic Structure and Aluminum Containing Iron Base $NO_x$ Reducing Catalytic Structure, respectively, filed Dec. 13, 1971.

The type and amount of $NO_x$ reducing catalyst which may be metallurgically bonded to the hereinbefore described substrate depends to a large degree on the environment in which the catalytic structure will be utilized. In exhaust gases emanating from the internal combustion engine, $NO_x$ catalysts selected from the group consisting of nickel, iron, cobalt, manganese, copper and mixtures thereof have been found to be especially effective. The main criteria for a suitable $NO_x$ catalyst is that (1) it does not deleteriously react with the substrate and (2) it is effective in reducing $NO_x$ gases at the temperature of intended use.

With regard to the effectiveness of the $NO_x$ catalyst, it should be pointed out that when using the hereinbefore described substrate care should be taken to avoid or minimize the migration of chromium and/or aluminum to the surface of the $NO_x$ catalyst, as such substances reduce catalyst efficiency. From a practical standpoint, when operating at temperatures ranging from about 1100° to about 1700°F, i.e., at temperatures usually experienced in today's automobiles, the individual chromium and aluminum content on the surface of the $NO_x$ catalyst should be less than about 15 and 4 weight percent, respectively. However, it should be pointed out here that when operating at higher temperatures and/or under different air to fuel ratios, it may be possible to tolerate a slightly higher weight percentage of chromium and/or aluminum on the surface of the catalytic layer and still have an efficient catalytic system. As used herein the term "surface of the catalytic layer" shall mean the volume defined by the area covered by the catalytic material taken to the depth measurable by a 20,000 volt microprobe, i.e., approximately 50 to 80 micro-inches in depth.

After the catalytic layer has been metallurgically bonded to the substrate, the catalytic layer can be differentiated from the substrate by the amount and distribution of chromium and/or aluminum (oxide formers) found in these respective sections of the resultant catalytic structure. In a system wherein the only oxide former used is chromium, as before noted, the amount of chromium present in the substrate can range from about 15 to about 50 weight percent. In the resultant catalytic structure, in weight percent, there usually is less chromium (oxide former) in the catalytic layer than in the substrate proper. In actual practice there usually is a gradient of chromium throughout the catalytic structure ranging from a point of maximum concentration in the substrate (at least 15 weight percent chromium) to a point of relatively low concentration in the catalytic layer (not greater than 15 weight percent at the surface of the catalyst zone). That is, the surface of the catalytic layer usually contains a lower weight percent of chromium than does the substrate. Stating it functionally, the substrate contains enough chromium to render it resistant to corrosion, whereas the catalyst layer contains none or minimum amounts of chromium so as to not impair its ability to function as a $NO_x$ reducing catalyst.

By utilizing the teaching of the instant invention, it is possible to obtain a $NO_x$ reducing catalytic structure which is highly efficient and exceptionally durable, i.e., resistant to attrition and corrosion.

Accordingly, a major object of the invention is to provide a system for catalytically reducing $NO_x$ found in the exhaust gases of the internal combustion engine.

A further object of the invention is to provide a catalytic structure which combines high $NO_x$ reducing activity with high structural stability and which is especially effective at the level of elevated temperatures normally experienced in the exhaust gases of the internal combustion engine.

Other objects and the means of accomplishing them will be apparent to those skilled in the art from the following description and claims.

BRIEF DESCRIPTION OF THE DRAWINGS

In FIGS. 1, 2 and 3, like parts are indicated by the like numerals. Specifically, in FIG. 1 is shown an expanded metal foil catalytic structure 10 comprises of a plurality of strands 12 which define apertures 14; in FIG. 2 the strands 12 and apertures 14 defined thereby are shown in an enlarged manner; in FIG. 3 a cross-sectional view of the strands 12 is shown.

In FIG. 4 there is shown the system of the invention for catalytically reducing $NO_x$ found in the exhaust stream of the internal combustion engine which system includes an internal combustion engine 20 having communicating therewith a source of fuel 22 and a source 24 of an oxidant (oxygen from air) for the fuel. During operation of the internal combustion engine 20 exhaust gases are generated which pass through the manifold or conduit 26 into the $NO_x$ reducing catalyst assembly or apparatus 28 which includes a housing 30 having a $NO_x$ reducing catalyst structure 32 composed of a sheet of expanded, thin metal foil of the type and composition described herein with a suitable nickel-copper $NO_x$ reducing catalyst material deposited on the surface thereof positioned therein. The exhaust gases, after $NO_x$ reduction, then exit from port 34. The so-treated gases are characterized by the fact that a significant amount of $NO_x$ has been removed therefrom.

Figure 1:
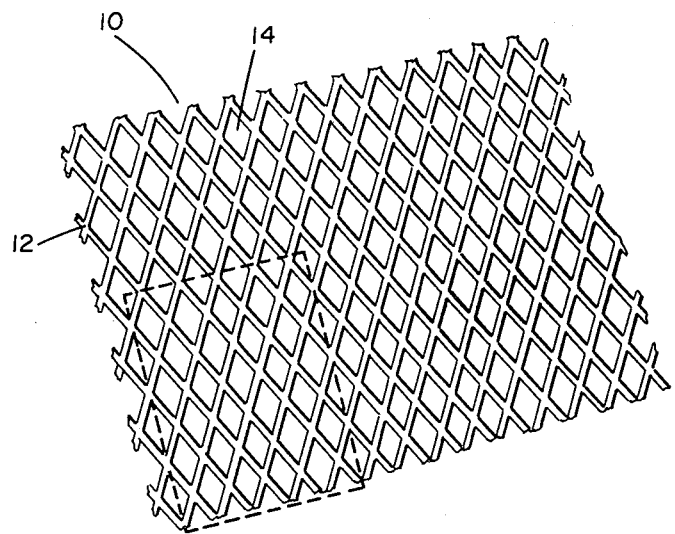
FIG. 1 is a plan view of the catalytic structure of the invention in the form of a sheet of expanded metal foil.
Figure 2:
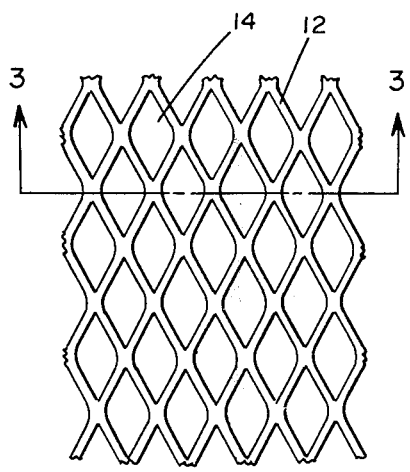
FIG. 2 is an enlarged plan view of the rectangular area of the catalytic structure shown in FIG. 1.
Figure 3:
FIG. 3 is a cross-sectional view taken along line 3—3 of FIG. 2 of the catalytic structure of the invention.

In the dual bed system, after the $NO_x$ reduction treatment, the exhaust gases are then brought into contact with an oxidation catalyst to remove carbon monoxide and gaseous hydrocarbons therefrom. As such oxidation catalysts are well known in the art, they will not be discussed herein in detail.

DESCRIPTION OF THE PREFERRED EMBODIMENTS OF THE INVENTION

In the preferred system of the invention, the herein described catalytic structure is formed from an expanded metal foil which, in turn, is stamped or otherwise fashioned into a suitable configuration, such as a disc, helical coil, corrugated strip, or the like, to provide a high surface, low mass catalyst assembly.

The catalytic structure of the invention is physically composed of a plurality of different zones or regions comprising a corrosion resistant substrate and a $NO_x$ reducing catalyst layer metallurgically bonded to the substrate with the chemical composition of the substrate being different than the chemical composition of the catalytic layer. The invention is best explained by the following preferred process sequence for making a chromium containing nickel base substrate having a copper and/or nickel $NO_x$ catalyst metallurgically bonded thereto.

The starting material is a conventional electroplated nickel foil produced continuously on a drum using a sulfamate bath. This produces commercially pure nickel which can contain up to about 1 percent by weight cobalt.

The nickel foil is, optionally, annealed in a furnace at a suitable temperature and thereafter expanded to provide an apertured metal structure having a thickness of less than about 10 mils. The annealing step facilitates the expanding operation only and appears to be otherwise not necessary. As the expanding process is well known, it will not be described herein in detail.

The apertured nickel foil structure is then plated with cobalt which is then diffusion alloyed with the nickel.

Subsequently, the expanded nickel foil is placed into a suitable, electrically conductive bath to uniformly electrodeposit thereon commercially pure chromium. The amount of chromium deposited is so controlled that chromium will constitute about 15 to about 50 weight percent of the resultant substrate. It has been found that a substrate having a chromium content of less than about 15 weight percent, depending on the operational characteristics of the engine in which it is to be used, does not provide enough high temperature corrosion resistance. Also, data has indicated that exceeding the upper range of chromium content imparts poor formability to the resultant structure.

The chromium coating on the apertured substrate, which is still predominantly in elemental form at this point, is alloyed with the substrate material by a thermal diffusion process which occurs in a furnace at about 2200°F under suitable conditions. The resulting metallurgical make-up of the so-produced substrate can range from a completely homogeneous nickel-cobalt-chromium alloy to one wherein the concentration of chromium continuously decreases as the center of the substrate is approached. In practice, the actual type of alloy obtained will depend on such parameters as starting foil thickness and time and temperature of the alloying process. Usually, a homogeneous alloy is utilized.

The above-described structure constitutes the substrate to which a highly active $NO_x$ reducing material is metallurgically bonded. Catalytic materials suitable for this purpose are copper, nickel, iron, cobalt, manganese and alloys thereof. Recent test data has shown that a catalytic layer consisting of 80 weight percent nickel and 20 weight percent copper has been especially effective in reducing $NO_x$ to less harmful substances. The before mentioned catalytic materials are metallurgically bonded to the substrate in such a manner that little, if any, of the catalytic material migrates into the substrate or intermediate zone. In practice, any catalytic material which actually migrates into the substrate proper does not significantly affect the chemical and physical properties of the substrate and is not considered as part of the substrate proper. Generally, the catalyst layer constitutes from about 0.5 to about 50 weight percent of the resultant catalytic structure. However, in use all that is required is that an effective amount of catalyst be present.

In the herein described embodiment of the invention, nickel and/or copper, if desired, is electroplated upon the substrate and subsequently metallurgically bonded thereto by diffusion which thereby establishes an outer catalytic zone or layer and an intermediate zone essentially defining the substrate. The diffusion treatment causes part of the chromium in the substrate to migrate toward and into the outer zone or catalytic layer. Microprobe tests have determined that varying amounts of up to 15 weight percent chromium can be present on the surface of the catalytic layer without seriously affecting its operability as a $NO_x$ reduction catalyst at temperatures ranging from about 1100° to about 1700°F. The exact upper limit of the permissible chromium content in the outer zone, and particularly in the surface thereof, under all circumstances is not yet known.

The catalytic structure of the instant invention comprises a nickel base substrate which supports or carries the $NO_x$ reducing catalyst. The following table shows substrate compositions which fall within the scope of the instant invention.

| Substrate Component | Element | Range (In Weight Per Cent of Substrate) |
|---|---|---|
| Filler Material | Nickel | 17 to 84 |
| Filler Material | Cobalt* | 0 to 40 |
| Filler Material | Iron* | 0 to 40 |
| Oxide Former | Chromium** | 5 to 50 |
| Oxide Former | Aluminum** | 0 to 10 |

*greater than a trace amount of either cobalt or iron must be present with the

-continued

| Substrate Component | Element | Range (In Weight Per Cent of Substrate) |
|---|---|---| individual weight percent of both cobalt and iron being less than the weight percent of nickel
**when both chromium and aluminum are present the weight percent of chromium plus aluminum cannot exceed 50

In the preferred practice of the system of the invention the internal combustion engine is operated in a manner such that the exhaust gases therefrom contain relatively low amounts of unreacted oxygen. Preferably less than 1 volume percent of unreacted oxygen is present. Usually, this is accomplished by operating the engine with an air/fuel ratio on the rich side of stoichiometric (rich referring to excess fuel) which is primarily achieved by adjusting the carburetion setting. It is also contemplated to utilize fuel injection as well as other conventional means to supply the engine with the necessary amounts of fuel and oxidant therefore. In the preferred practice of the system of the instant invention it is generally desirable to operate the internal combustion engine in a manner such that the air/fuel ratio generally ranges from about 13.8 to 1 to about 14.5 to 1. However, it will be appreciated by those skilled in the art that depending on the specific fuel utilized, the type of catalyst employed and the temperature at which the gases contact the concerned catalyst this ratio may vary slightly. In general, it can be stated that the ratio of carbon monoxide to oxygen found in the exhaust gas should range from about two to one to about six to one. Clearly, a net reducing atmosphere is to be provided.

The following examples of the invention are for illustrative purposes only and are not intended to limit the scope of the invention.

EXAMPLE I

A sheet of electrodeposited nickel foil having a thickness of about 0.004 inches is expanded by conventional techniques to produce an open mesh expanded structure having a strand width of about 0.015 inches and about 10 holes per inch. This sheet of expanded nickel foil is then electroplated on all of its surfaces with a 0.001 inch thick layer of cobalt. The cobalt is then diffused into the nickel foil by heating to a temperature of about 2200°F for about 2 hours under subatmospheric conditions (½ atmosphere of argon). Subsequently, this sheet of expanded nickel-cobalt foil is then electroplated with chromium until a 20 percent increase in weight is achieved. The chromium is alloyed with the nickel-cobalt foil by heating the so-coated expanded foil metal structure in a ½ atmosphere of argon at a temperature of about 2200°F for a period of about 2 hours. The chemical composition of the resulting substrate is about 53 weight percent nickel, about 27 weight percent cobalt and about 20 weight percent chromium. The complete surface of the so-produced substrate is then electroplated with nickel to provide a coating thickness of about 0.001 inches. The nickel is then diffusion bonded to the substrate by heating the nickel-coated article at reduced pressure (½ atmosphere of argon) to a temperature of about 1900°F for about 2 hours.

The catalytic layer on the resultant catalytic structure is essentially nickel and constitutes about 21 weight percent of the catalytic structure.

EXAMPLE II

A sheet of electrodeposited iron having a thickness of about 0.001 inch is expanded by conventional techniques to produce an open mesh structure having a strand width of about 0.015 inches and 10 holes per inch. This sheet of expanded iron foil is then electroplated with a 0.001 inch layer of nickel. The nickel is then diffused into the iron foil by heating at subatmospheric pressures (½ atmosphere of argon) at a temperature of about 2200°F for about 2 hours. The so-produced iron-nickel structure is electroplated wth chromium until a 20 percent increase in weight is achieved. Subsequently, the chromium is alloyed with the iron-nickel structure by heating in a ½ atmosphere of argon at a temperature of about 2200°F for a period of about 2 hours. The resulting substrates composition is about 25 weight percent iron, about 55 weight percent nickel and about 20 weight percent chromium. The complete surface of the so-produced substrate is electroplated with a layer of nickel 0.001 of an inch thick. The nickel catalytic material is then diffusion bonded to the substrate by heating the resultant structure at a reduced pressure of about ½ atmosphere of argon to a temperature of about 1900°F for a period of about 2 hours.

The catalytic layer on the resultant structure is similar in type to that describe in Example I. However, in the present Example, the catalytic layer constitutes about 36 weight percent of the catalytic structure.

EXAMPLE III

A catalytic structure is produced as described in Example II above except that after the nickel is electroplated on the iron base, a 0.0005 inches thick coating of cobalt is plated on the iron-nickel base structure and subsequently alloyed therewith by heating in a reduced atmosphere (½ atmosphere of argon) to a temperature of 2200°F for a period of about 2 hours.

The composition of the substrate produced as above-described is about 41 weight percent nickel, about 18 weight percent iron, 21 weight percent cobalt, and about 20 weight percent chromium.

The catalytic layer on the resultant catalytic is similar in type to that described in Example I. However, in the instant example, the catalytic layer constitutes about 29 weight percent of the catalytic structure.

EXAMPLE IV

A catalytic structure is produced as described in the Example III above, except that after the chromium is diffused into the iron-nickel structure, 0.0003 inches of aluminum are vapor plated on all of the surfaces thereof and then diffused therein by heating in a reduced atmosphere (½ atmosphere of argon) at a temperature of about 1900°F for about 8 hours. The composition of the above-described substrate is about 40 weight percent nickel, 20 weight percent cobalt, 17 weight percent iron, 19 weight percent chromium and 4 weight percent aluminum.

An analysis of the resultant catalytic structure showed that the catalytic layer constitutes about 28 weight percent of the catalytic structure.

With regard to catalytic structures of the foregoing type, recent tests have shown that they exhibit remarkably superior performance characteristics with respect to reduction of $NO_x$ when compared to any known $NO_x$ reducing catalytic structure. At this time, the exact mechanism which makes these results possible is not yet completely understood. It may reside in the chemistry of the system, the use of expanded metal foil, the interaction of the materials, or a combination thereof.

Figure 4:
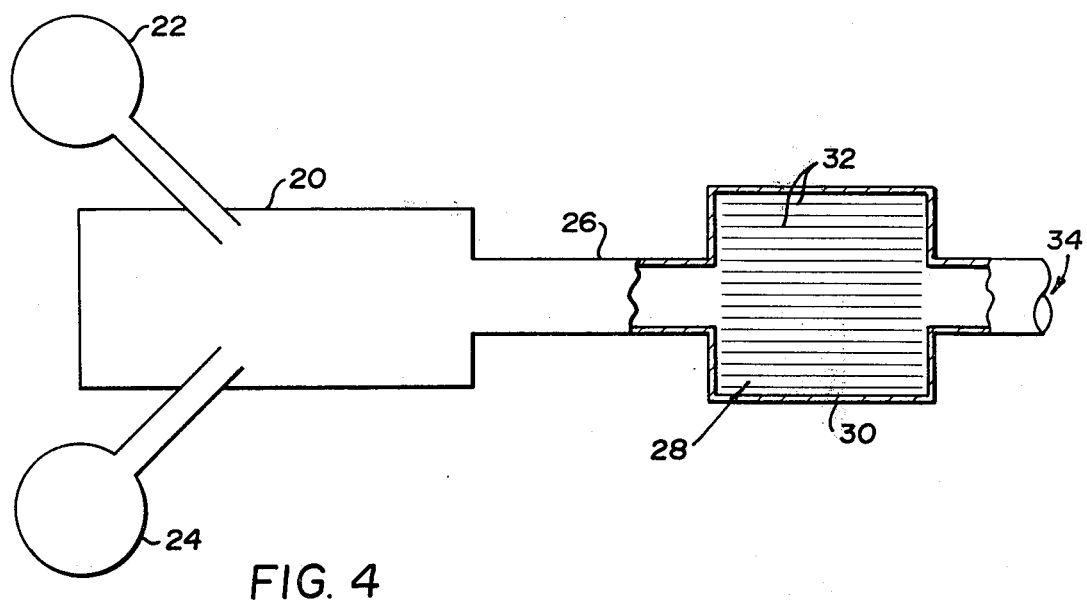
FIG. 4 is a diagrammatical illustration of the system of the invention.

Catalysts of the type described herein have been utilized in a system for operating an internal combustion engine (as described relative to FIG. 4) with a high degree of success. Such a system when used in conjunction with a conventional oxidation catalyst provides an ideal method for reducing $NO_x$, carbon monoxide and unburned hydrocarbon content of automotive exhaust gases.

While the discussion herein has, in the main, concerned an apertured substrate structure obtained by expanding metal, it will be readily appreciated by those skilled in the art that an apertured structure can also be achieved by such techniques as slip casting, roll forming, perforating metal sheet, direct electroplating of the structure, joining strands of fibers together and the like.

As can be seen from a review of the foregoing, the instant invention concerns an article for reducing the $NO_x$ content of the exhaust gas stream emanating from the internal combustion engine and a method of using such an article which comprises bringing the exhaust gas stream into contact with a $NO_x$ reducing structure of the type herein described which includes an oxidation resistant substrate having an effective amount of a $NO_x$ reducing catalyst on the surface thereof.

While there have been described what are at present considered to be the preferred embodiments of this invention, it will be obvious to those skilled in the art that various changes and modifications may be made therein without departing from the spirit and scope of the invention as hereinafter claimed.

What is claimed is:

1. In the combination comprising an internal combustion engine and a catalyst for catalytically reducing nitrogen oxides in the exhaust gases of said engine, the improvement wherein said catalyst comprises a thin expanded metal foil structure comprising a corrosion resistant nickel base substrate having an effective amount of $NO_x$ reducing catalyst metallurgically bonded on the surface thereof, said nickel base substrate before metallurgical bonding of said $NO_x$ catalyst comprising:
   from about 50 to about 85 weight percent of a mixture of nickel and a metal selected from the group consisting of iron, cobalt and mixtures thereof, with nickel always being present in an amount equal to at least about 17 weight percent of the substrate and the weight percent of iron and cobalt individually never exceeding about 40 percent and always being less then the weight percent of nickel, but at least one thereof being present in excess of a trace amount; and
   from about 15 to about 50 weight percent of a metal selected from the group consisting of chromium, aluminum and mixtures thereof with at least about 5 weight percent of chromium always present in the substrate and the amount of aluminum never exceeding about 10 weight percent;
   the chemical composition of the catalytic layer being different than the chemical composition of said substrate.

2. The combination of claim 1 wherein said $NO_x$ reducing catalyst comprises a metal selected from the group consisting of nickel, cobalt, iron, manganese, copper and mixtures thereof.

3. The combination of claim 2 wherein said $NO_x$ reducing catalyst is an alloy of copper and nickel.

4. The combination of claim 3 wherein said $NO_x$ reducing catalyst consists essentially of 80 weight percent nickel and 20 weight percent copper.

5. The combination of claim 1 wherein said expanded thin metal has a thickness of less than about 0.010 inches.

6. The combination of claim 1 wherein said catalytic layer constitutes from about 0.5 weight percent to about 50 weight percent of said catalytic structure.

7. The combination of claim 1 wherein the surface of said catalytic layer contains less than about 15 weight percent of chromium.

8. The combination of claim 7 wherein the weight percent of chromium on the surface of the catalytic layer is less than the weight percent of chromium in the substrate.

9. The combination of claim 7 wherein said chromium is present as a gradient of concentration, the concentration in said substrate being a maximum and the concentration of said surface being essentially zero.

10. The combination of claim 1 wherein the surface of said catalytic layer contains less than about 4 weight percent aluminum.

11. The combination of claim 3 wherein said chromium is present as a gradient of concentration, the concentration in said substrate being a maximum and the concentration on said surface being essentially zero.

12. In the method of treating exhaust gases emanating from an internal combustion engine to catalytically reduce nitrogen oxides in said gases to relatively harmless substances, the improvement comprising:
   contacting said gases with an $NO_x$ reducing catalyst comprising a thin expanded metal foil structure comprising a corrosion resistant chromium and aluminum containing nickel base substrate having an effective amount of $NO_x$ reducing catalyst metallurgically bonded on the surface thereof, said nickel base substrate before metallurgical bonding of said $NO_x$ catalyst comprising:
      from about 50 to about 85 weight percent of a mixture of nickel and a metal selected from the group consisting of iron, cobalt and mixtures thereof, with nickel always being present in an amount equal to at least about 17 weight percent of the substrate and the weight percent of iron and cobalt individually never exceeding about 40 percent and always being less than the weight percent of nickel, but at least one thereof being present in excess of a trace amount; and
      from about 15 to about 50 weight percent of a metal selected from the group consistng of chromium, aluminum and mixtures thereof with at least about 5 weight percent of chromium always present in the substrate and the amount of aluminum never exceeding about 10 weight percent;
   the chemical composition of said catalytic layer being different from the chemical composition of said substrate.

13. The method of claim 12 wherein said $NO_x$ reducing catalyst before metallurgical bonding comprises a metal selected from the group consisting of nickel, cobalt, iron, manganese, copper and mixtures thereof.

14. The method of claim 13 wherein said $NO_x$ reducing catayst comprises an alloy of copper and nickel.

15. The method of claim 13 wherein said foil has a thickness of less than about 0.010 inches.

16. The method of claim 15 wherein said $NO_x$ reducing catalyst comprises an alloy of copper and nickel.

17. The method of claim 13 wherein said chromium is present in said catalytic structure as a gradient of concentrations, the concentration in said substrate being at a maximum and the concentration on said surface being a minimum and not more than 15 percent.

18. The method of claim 14 wherein said chromium is present in said catalytic structure as a gradient of concentrations, the concentration in said substrate being at a maximum and the concentration on said surface being a minimum and not more than 15 percent.

19. The method of claim 13 wherein said exhaust gases contain CO, $H_2$ and hydrocarbons.

* * * * *